M. B. COE.
COTTON PICKER.
APPLICATION FILED JULY 16, 1908.
927,118.
Patented July 6, 1909.
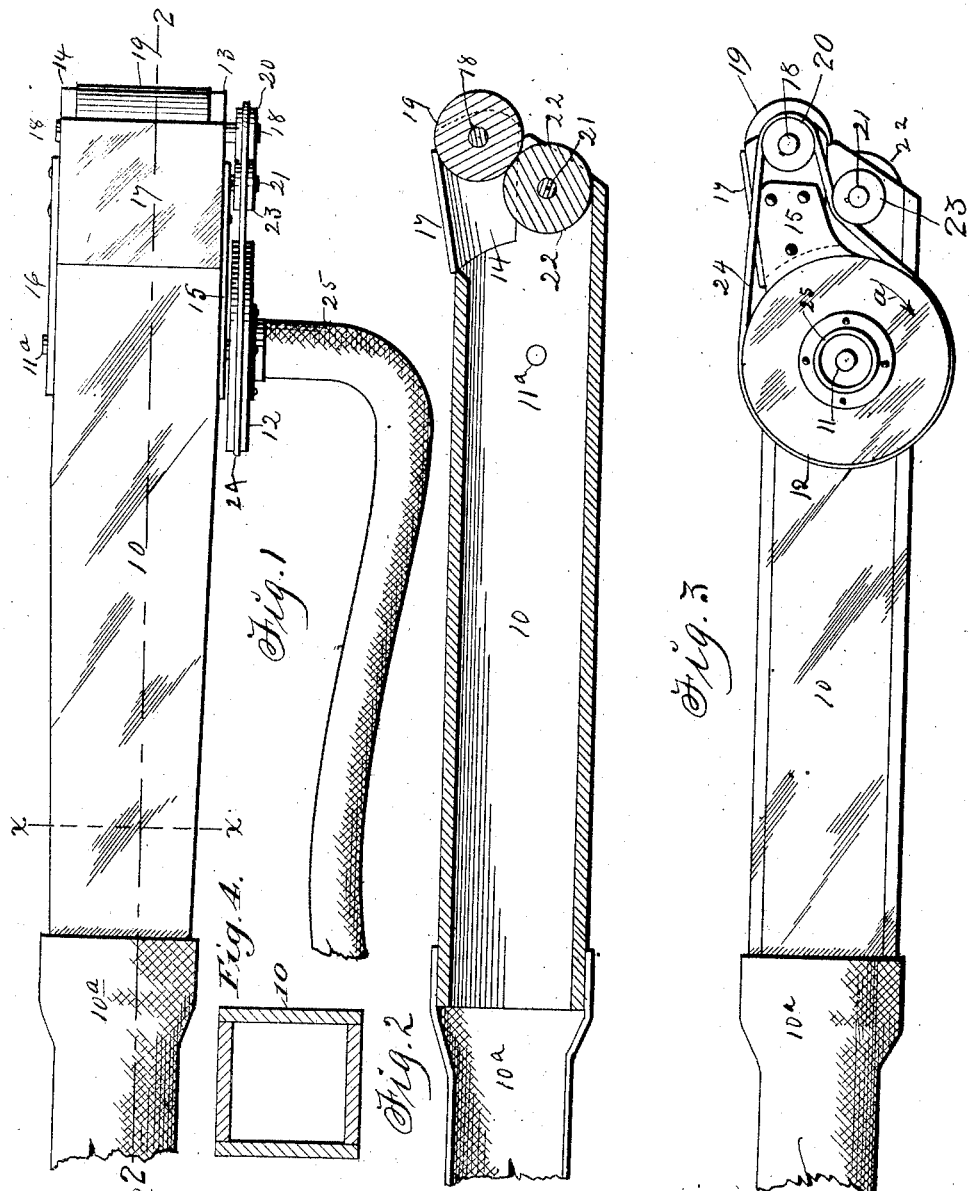
Witnesses:
K. B. Keffer.
A. Anderson
Inventor: Milton B. Coe,
By Thomas G. Orwig and Co. Attys.

UNITED STATES PATENT OFFICE.

MILTON B. COE, OF RANKIN, OKLAHOMA.

COTTON-PICKER.

No. 927,118.　　　　Specification of Letters Patent.　　　Patented July 6, 1909.

Application filed July 16, 1908. Serial No. 444,294.

*To all whom it may concern:*

Be it known that I, MILTON B. COE, a citizen of the United States of America, and resident of Rankin, Roger Mills county, Oklahoma, have invented a new and useful Cotton-Picker, of which the following is a specification.

The object of this invention is to provide an improved construction for cotton pickers.

My invention consists in the construction, arrangement and combination of elements hereinafter set forth, pointed out in my claims and illustrated by the accompanying drawing, in which—

Figure 1 is a plan of my improved device. Fig. 2 is a longitudinal section of the device on the indicated line 2—2 of Fig. 1. Fig. 3 is a side elevation of the device. Fig. 4 is a transverse section on the line x x of Fig. 1.

In the construction of the device shown, the numeral 10 designates a tube or nozzle which is preferably larger at one end portion than at the other. The smaller end portion of the tube or nozzle 10 is attached to one end portion of a flexible tube 10ª leading to a place of deposit of picked cotton (not shown). The forward larger end portion of the tube 10 is open to form a mouth and is cut away in the upper portion of its sides and across its top. A stub axle 11 is mounted on and extends laterally from one side of the forward end portion of the tube 10 and a pulley 12 is mounted for rotation on said stub axle. Blocks 13, 14 are mounted in the spaces formed by cutting away the forward ends of the sides of the tube 12 and wings or plates 15, 16 are fitted to said notches and are pivoted to the sides of said tube, the points of pivoting being in alinement with the axis of the pulley 12. The wing 15 may be pivoted on the stub axle 11 while the wing or plate 16 is pivoted on a similar stud 11ª projecting oppositely therefrom. The blocks 13, 14 are connected by a top plate 17. A picker shaft 18 is mounted for rotation in and connects the extremities of the blocks 13, 14 and a picker drum 19 or roller is fixed to and rotated by said shaft between said blocks. A pulley 20 is mounted on one end portion of the shaft 18. A picker shaft 21 is mounted for rotation in and connects the extremities of the sides of the tube 10 below and slightly to the rear of the picker shaft 18. A picker drum or roller 22 is mounted rigidly on and rotated by the picker shaft 21 between the ends of the sides of the tube 10 and in a plane below and to the rear of the drum 19. A pulley 23 is fixed to one end portion of the picker shaft 21. The pulleys 12, 20 and 23 are preferably of the grooved variety and a belt, 24, preferably round in cross-section, is mounted in and connects said pulleys as shown in Fig. 3. The pulley 12 is connected by a flexible shaft 25 to a prime mover (not shown) which may be a motor carried on the wagon into which the picked cotton is loaded. Normally, the drums 19 and 22 are slightly separated owing to the contractile tendency of the belt 24 and the drum 19 is free to rise and fall relative to the other drum because its shaft is carried in the extremities of the blocks 13, 14 pivoted to the tube 10 by the wings or plates 15, 16.

In practical use the pulley 12 is driven by the flexible shaft 25 in the direction of the arrow a in Fig. 3 and in so doing causes the belt 24 to drive the drum shafts 18, 21 in opposite directions so that the drums 19, 22 will tend to receive bolls of cotton between the adjacent points of their peripheries and draw the same from the cotton plant into the tube 10. The drum 19 may separate freely from the drum 22 to permit the passage of the cotton seeds contained in the bolls or for any other reason. The drum 19 may be pressed toward the drum 22, to cause said drums to engage the cotton to be picked, by manual pressure applied to the top cross piece or top plate 17.

Any desired means may be employed to remove the cotton from the tubes 10, 10ª and such means forms no part of my present invention.

I claim as my invention—

1. A cotton picker, comprising a tube angular in cross-section, a picker drum mounted for rotation transversely of the mouth of said tube, a hinged member on and above the mouth of said tube, the tube at the upper portion of its mouth being cut away, a picker drum mounted upon said hinged member and extending transversely of the mouth of the tube above and in front of the first picker drum, the peripheries of said picker drums being contiguous, and means for oppositely rotating said drums.

2. A cotton picker, comprising a tube angular in cross-section, the upper portion of the mouth of the tube being cut away, blocks mounted loosely on opposite sides of the upper portion of said mouth, plates fixed to said blocks and pivoted in alinement to opposite sides of the tube, a drum mounted on and connecting said blocks, a drum journaled in and transversely of the mouth of the tube below and to the rear of the first drum, the peripheries of the drums being contiguous, and means for rotating said drums oppositely.

3. A cotton picker, comprising a tube, a picker drum mounted transversely thereof, blocks hinged to said tube, a plate connecting said blocks, a picker drum mounted upon and transversely of said blocks, the peripheries of said picker drums being contiguous, and means for rotating said drums oppositely.

4. A cotton picker, comprising a tube, a picker drum mounted transversely thereof, a hinged member on said tube, a picker drum mounted upon and transversely of said hinged member, the peripheries of said drums being contiguous, pulleys on said drums, a pulley on the tube, a belt connecting said pulleys, and means for driving the pulley on the tube.

MILTON B. COE.

Witnesses:
R. H. ORWIG,
THOMAS G. ORWIG.